Figure 1:
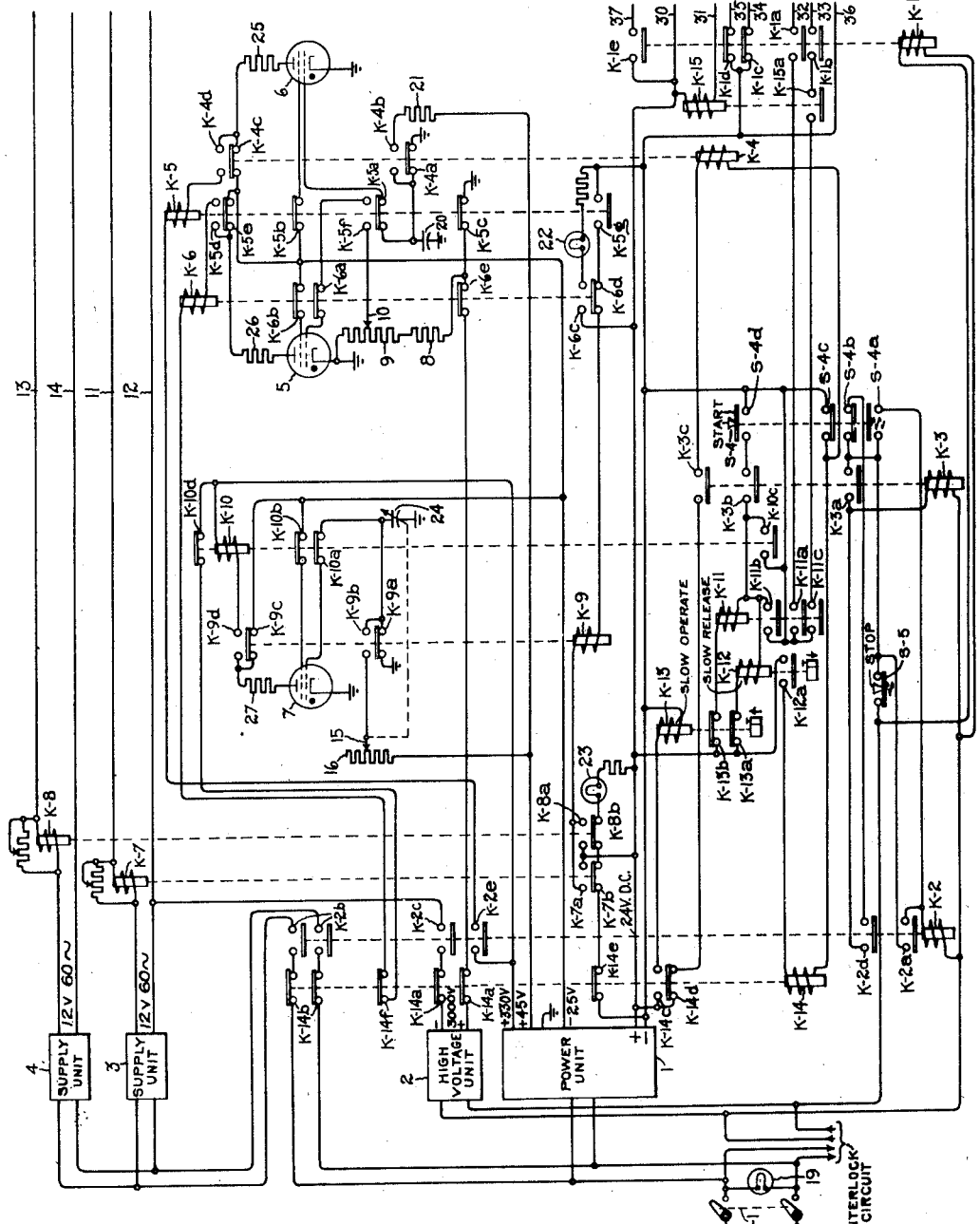

Inventor:
Robert A. Doncyson,
by Merton W Moore
His Attorney.

Patented Feb. 5, 1952

2,584,680

UNITED STATES PATENT OFFICE 2,584,680

AUTOMATIC TESTING APPARATUS

Robert A. Doncyson, Syracuse, N. Y., assignor to General Electric Company, a corporation of New York Application April 16, 1949, Serial No. 87,922

6 Claims. (Cl. 175—183)

This invention relates generally to the testing of electric circuits and more particularly to an apparatus for providing automatic sequential testing of a large number of electric circuits for continuity and insulation resistance.

In the commercial production of electrical equipment, it is often necessary to test large numbers of identical circuits in items such as cables, junction boxes, wiring harnesses and electric networks. The testing, in general must provide insurance that all joints in any circuit of the item under test have sufficiently low resistance, and also that the insulation everywhere throughout the item can safely withstand a predetermined voltage. Also it is necessary that the test reveal any mistakes which have been made in the assembly and connections of the wiring.

A complete test consists of two parts, a continuity test and an insulation resistance test. The continuity test, in its essence, resolves itself into passing a current through the individual circuit being tested and measuring the voltage developed across its terminals to insure that it does not exceed a predetermined value. If this value is exceeded, it indicates that the resistance of either the elements or the joints in the circuit is too high and that some part therein is defective. The insulation test consists of applying a very high voltage between all parts of the circuit which are insulated and ground, and measuring the leakage current to insure that it does not exceed a predetermined value. If this value is exceeded it indicates that the insulation is defective in the particular circuit being tested.

It is an object of my invention to provide an apparatus for automatically and sequentially testing a large number of circuits for both continuity and insulation.

Another object of my invention is to provide an apparatus for automatically testing a large number of circuits by applying to each one of them, in sequence, a current for measuring its continuity and a test potential for measuring its insulation resistance.

A further object of my invention is to provide an apparatus which will automatically apply, to a number of terminals in sequence, a current for measuring the continuity and a high potential for measuring the insulation resistance of external circuits connected to these terminals, and which will stop its operation and provide a suitable indication when a defective circuit is encountered.

For further objects and advantages and for a better understanding of the invention, attention is now directed to the following description and accompanying drawings, and also to the appended claims in which the features of my invention believed to be novel are more particularly pointed out.

Figure 2:
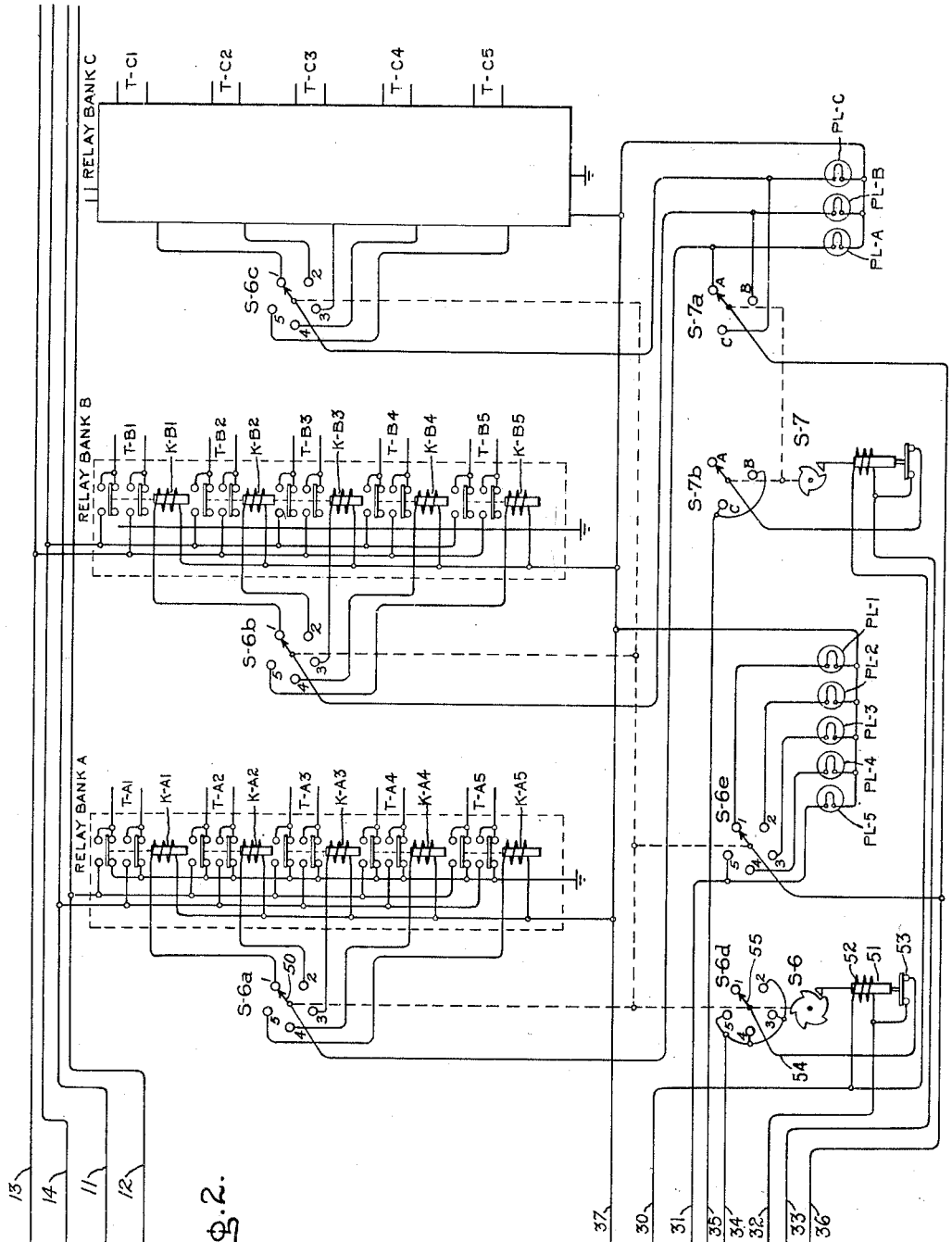

In the drawings:

Fig. 1 and Fig. 2 are a schematic representation of an automatic testing apparatus embodying my invention. To facilitate the illustration in form of drawings, the apparatus has been considered in two parts. The first part shown in Fig. 1 contains the actual testing apparatus, sufficient in itself to perform a complete test for both continuity and insulation resistance on a single circuit in a particular item under test. The second part shown in Fig. 2 contains switching and indicating elements which operate in conjunction with the equipment illustrated in Fig. 1 to connect, in sequence, to the apparatus of Fig. 1, the different circuits of the item under test for individual testing thereof.

Figure 3:
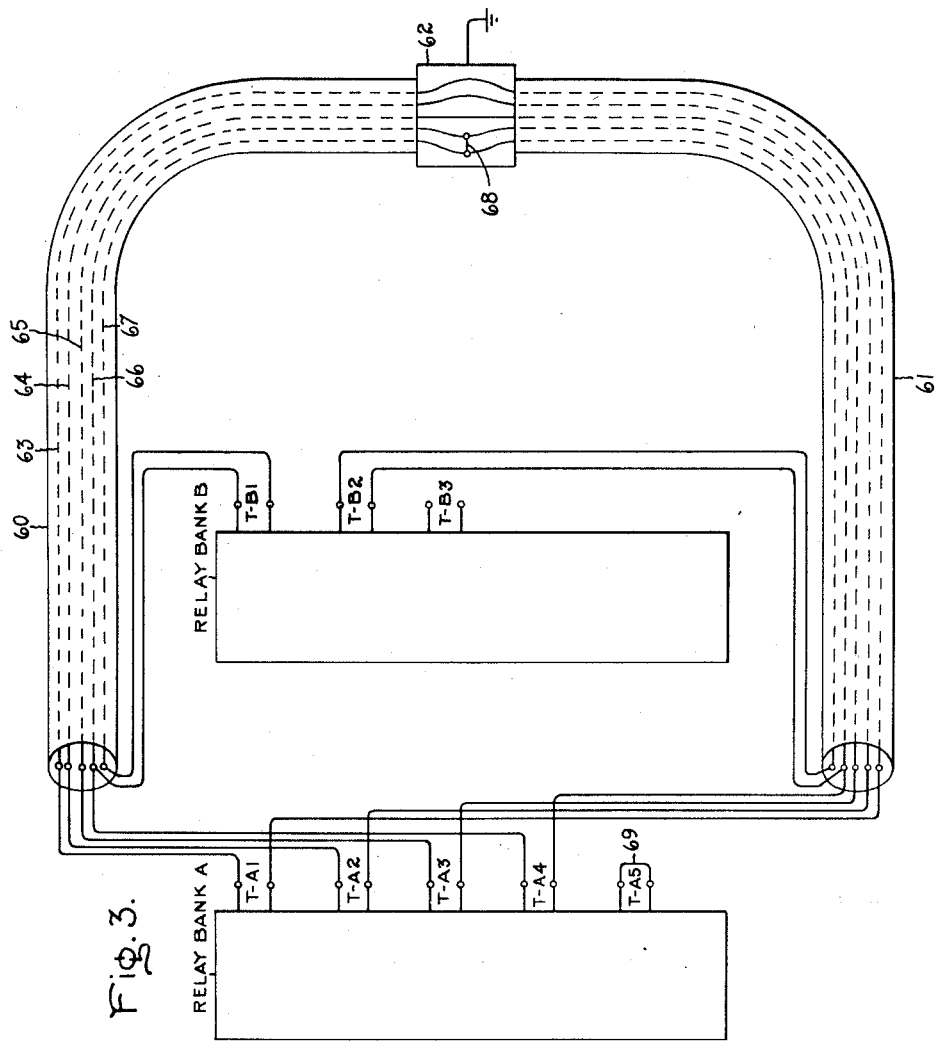

Fig. 3 is a schematic illustration of a typical test item of a type ideally suited for testing for continuity and insulation resistance through the use of my automatic testing apparatus.

Referring to Fig. 1, there is shown a power unit 1 which is adapted to supply unidirectional potentials of +330 volts, +45 volts, —25 volts and 24 volts D. C. at the terminals indicated when an alternating voltage, normally at 115 volts 60 cycles, is applied to its input terminals. A high voltage unit 2 provides unidirectional voltage, adjustable up to 3000 volts, at its output terminals when the alternating supply voltage is applied to its input terminals. A pair of current supply units 3 and 4 provide an output voltage of 12 volts at a frequency of 60 cycles when the alternating supply voltage is applied to their input terminals.

The function of the power unit is to provide suitable voltages for operating three electron discharge devices 5, 6 and 7. These devices are tetrodes of the gaseous type, commonly known as thyratrons and each of them has an anode, a cathode, and a first and second control electrode, the first control electrode being situated nearer the cathode and having the major controlling effect. Power unit 1 also supplies unidirectional voltage at 24 volts for operating the relays and indicating lamps which are used throughout the apparatus. The high voltage unit 2 provides the high test potential, nominally of 3000 volts, for measuring the insulation leakage of the item under test.

The leakage is measured by applying the high test potential between the terminals of an individual circuit, which is insulated from ground, and a pair of resistors 8 and 9 which are connected in series to ground, the positive side of the test potential being applied to resistor 8. Depending upon the leakage current through the test circuit, a positive voltage is developed across resistors 8 and 9. An adjustable tap 10 on resistor 9 permits the utilization of a part of the voltage developed thereacross, for triggering or firing electron discharge device 5 when the leakage current exceeds a predetermined value.

Current supply units 3 and 4 provide an output voltage of 12 volts at a frequency of 60 cycles between leads 11 and 12, and 13 and 14 respectively. The circuit to the item under test is completed through elements of the automatic testing equipment which are shown in Fig. 2 and these will be described subsequently. However, the individual circuit under test is effectively connected across either leads 11 and 12, or across leads 13 and 14, during a testing cycle. Current supply unit 3 is used when the circuit under test is insulated from ground and it is desired to measure this insulation. Current supply unit 4, on the other hand is used whenever it is desired to test a particular circuit for continuity only and not for insulation resistance, as would be the case when the circuit contains a connection to ground or has a cross-connection to some other circuit. When the unit under test has the proper continuity, or, in other words, has a series resistance below a predetermined value, a relay in series with either lead 11 or lead 13 operates. On the other hand if the continuity of the circuit is defective, the current will be too low to operate the relay in question, and the circuit will thereupon be recognized as defective.

The function of electron discharge device 5 is to fire or conduct whenever the leakage current to ground through a test circuit exceeds a predetermined value. When device 5 conducts, a relay in its anode circuit is energized and causes associated apparatus to provide a suitable indication of the defective insulation.

Electron discharge device 6 provides a time delay between the application of the 3000 volt test potential to the circuit under test, and the application of the voltage occurring at tap 10 to the control electrode of device 5. This delay is necessary to offset the effect of charging currents to the item under test due to its inherent capacitance, when the test potential is first applied to it. If the voltage developed across resistance 9 were immediately applied to the control electrode of device 5, it would trigger or fire immediately and would not give a true indication of the leakage of current through the insulation, but would simply give an indication of the capacitance of the circuit.

Device 7 provides a time interval during which the 3000 volt test potential and the continuity current are applied to the test circuit. The length of this interval is determined by the setting of tap 15 on resistor 16 and by the setting of variable capacitor 24, and can be varied at will in accordance with the test requirements of the particular item. Tap 15 and variable capacitor 24 are mechanically lined to facilitate their adjustment.

The function of the relays and switches in Fig. 1 is to permit the sequential operation of the different parts of the apparatus. To simplify the description of the automatic testing apparatus, the remainder of the elements in the circuit of Fig. 1 will now be considered in the order of their operation as the equipment would normally operate in testing an individual circuit of an item.

The apparatus operates from a 115 volt 60 cycle supply which is made available at the terminals of a plug 17, through fuses 18 to switch S-1. Closing switch S-1 puts the apparatus into operative condition, as indicated by pilot lamp 19, and energizes the power unit 1, making the unidirectional voltages of +330 volts, +45 volts, −25 volts, and 24 volts D. C. immediately available.

When the individual circuit of the item under test is properly connected, it appears across either leads 11 and 12 or across leads 13 and 14. The item under test is normally placed in an enclosure which contains an interlock circuit as a protective device. Closing the interlocking enclosure completes this interlock circuit, thus applying the alternating supply voltage to the input of high voltage unit 2 which delivers a unidirectional voltage of 3000 volts across its output terminals. Closing the interlocking enclosure also causes relay K-1 to be energized, causing normally open contacts K-1a and K-1b to close, and normally closed contacts K-1c and K-1d to open. These contacts control the supply of the 24 volt control voltage to the relays, switches and indicating lamps of Fig. 2, as will appear subsequently.

The apparatus is now ready to begin its sequential operation and this is initiated by pressing start switch S-4. Switch element S-4a completes a circuit for the 115 volt supply through relay K-2 which is immediately energized. Relay K-2 has a holding contact K-2a which short circuits start switch element S-4a so as to make it unnecessary to hold S-4 closed. Relay K-2 causes both current supply units 3 and 4 to be energized through its contacts K-2b, and also causes the negative side of the 3000 volt test potential to be applied to lead 12 through its contacts K-2c. Also relay K-2 has a normally open contact K-2d which closes and as soon as pushbutton S-4 is released, a circuit is completed for the 115 volt supply through switch element S-4b to the coil of a relay K-3 which is thereupon energized. This combination of relay K-2 and relay K-3 is necessary in order to use the pushbutton switch S-4 not only to start the operation of the apparatus at the beginning of the testing sequence, but also to re-start the apparatus to continue the testing sequence after any stoppage due to a failure in an item under test. Relay K-3 has a holding contact K-3a which short circuits switch elements S-4b, so that once switch S-4 has been pressed, any further pressing of it to re-start the apparatus will not cause relay K-3 to be de-energized. The other contact K-2e controls the +330 volt supply to the anode of device 6.

The energizing of relay K-3 causes its normally open contact K-3c to complete a circuit from the 24 volt D. C. supply to energize the coil of relay K-4 through switch element S-4c.

The energizing of relay K-4 causes its normally closed contact K-4a to open, thereby removing the short circuit across capacitance 20, and its normally open contacts K-4b to close, thereby permitting the charging of capacitance 20 through a resistor 21 which is connected to the +45 volt output terminal of power unit 1. The energizing of relay K-4 also opens normally closed contact K-4c, thereby removing the −25 volt bias applied to the anode of device 6 through resistor 25, and closes contact K-4d, thereby applying +330 volts to the anode of device 6. The purpose of resistor 25, and also of similar resistors 26 and 27 in the anode circuits of electron discharge devices 5 and 7, is to limit the current through the device when it conducts. Capacitor 20 and resistor 21 are selected so that in approximately one second, the voltage developed across capacitor 20 is sufficient to fire or trigger electron discharge device 6.

The current drawn by device 6 during conduction causes relay K-5 to operate. The energizing of relay K-5 causes normally closed contacts K-5a and K-5b to open, thereby removing both the positive voltage applied to the first control electrode, and the negative voltage applied to the second control electrode, and device 6 will henceforth continue to conduct only as long as contact K-4d remains closed. The energizing of relay K-5 also causes normally closed contact K-5c to open, so that the positive side of the 3000 volt test potential, instead of being directly connected to ground, is now connected to ground through resistors 8 and 9 in series. Any leakage current in the insulation of the individual circuit of the item under test will now flow through resistors 8 and 9 and develop a positive voltage across them. Tap 10 on resistor 9 is adjusted so that a suitable proportion of the voltage developed across resistor 9 may be applied to the first control electrode of device 5, taking into consideration the allowable limits of the leakage current through the insulation of the particular circuit. The energization of relay K-5 also causes contact K-5d to close, thereby applying +330 volts to the anode of device 5, contact K-5e to open, thereby removing the −25 volt bias from said anode, contact K-5f to close, thereby connecting the control electrode to potentiometer tap 10, and contact K-5g, to close, making possible the completion of a circuit through the coil of a relay K-9.

If the insulation resistance of the circuit under test is defective so that the leakage current is greater than the predetermined value, the voltage produced at the first control electrode triggers device 5, which thereupon conducts and energizes relay K-6 in its anode circuit. This causes normally closed contacts K-6a and K-6b to open, thereby removing the control potentials from both the first and second control electrodes. Device 5 then continues to conduct so long as contact K-5d remains closed through the energization of relay K-5. Contact K-6c closes and completes the circuit from the 24 volt D. C. supply to pilot lamp 22 which serves as an insulation failure indicator. Also normally closed contact K-6d opens and prevents the completion of the circuit from the 24 D. C. volt supply through the coil of a relay K-9 whose function will be described subsequently, and contact K-6e opens to disconnect the positive side of the test potential from resistors 8 and 9.

On the other hand, if the insulation resistance of the circuit under test is satisfactory, the leakage current does not exceed the predetermined value, so that device 5 is not triggered and relay K-6 remains unenergized. When such is the case, contact K-6d remains in its normally closed position, making possible the completion of a circuit through the coil of relay K-9.

The energization of relay K-2 which has previously been mentioned, caused normally open contacts K-2b to close so that the alternating supply voltage was applied to the input terminals of current supply units 3 and 4. Assuming for the moment that the individual circuit of the item under test is connected across leads 11 and 12, if its series resistance exceeds a predetermined value, the current flowing therethrough will be insufficient to energize the current relay K-7. Then normally open contact K-7a remains open, so that again the completion of the circuit through the coil of relay K-9 is prevented. Normally closed contact K-7b also remains closed, so that pilot lamp 23 operating as a continuity failure indicator remains lit. Similarly, when the test circuit appears across leads 13 and 14, if its series resistance exceeds the predetermined value, relay K-8 is not energized, in which case contacts K-8a and K-8b perform respectively the functions of preventing a circuit through the coil of relay K-9, and of causing continuity failure pilot lamp 23 to remain lit.

If the series resistance of the circuit under test is lower than the predetermined value, sufficient current will flow therethrough to energize relay K-7, thereby causing normally open contact K-7a to close, and normally closed contact K-7b to open. The closing of contact K-7a now permits the energizing of the coil of relay K-9, assuming that normally closed contact K-6d has remained closed due to the failure of device 5 to fire as a result of the sufficiency of the insulation of the circuit under test. Also normally closed contact K-7b opens, thereby opening the circuit of continuity failure lamp 23 so that it is extinguished.

If relay K-6 operates or if either relay K-7 or relay K-8 fails to operate, as the case may be, the coil of relay K-9 cannot be energized and the sequential operation of the apparatus proceeds no further. When relay K-9 does become energized, it causes normally closed contact K-9a to open, thereby removing the short-circuit across capacitor 24, and contact K-9b to close, thereby permitting the charging of capacitor 24 through resistor 16 from the +45 volt supply. Also the energizing of relay K-9 causes normally closed contact K-9c to open, thereby removing the −25 volt bias on the anode of device 7, and normally open contact K-9d to close, thereby applying +330 volts to the anode of device 7.

As has already been mentioned, the setting of tap 15 on resistor 16, and the adjustment of variable capacitor 24 determine the length of time during which high potential and continuity current are applied to the circuit under test. The instant at which device 7 fires and conducts depends upon the attainment of a predetermined voltage by capacitor 24, and this can be controlled by varying the setting of tap 15 and of capacitor 24, in accordance with well known known principles. If at any time during the interval throughout which capacitor 24 is charging, device 5 should be fired and begin to conduct, relay K-6 will immediately be energized and cause relay K-9 to be de-energized, and the process of charging capacitor 24 is immediately brought to an end. Likewise if the resistance of the circuit under test should for some reason increase during the time interval throughout which capacitor 24 is charging, relay K-9 would again be de-energized and the sequence of operations would be brought to an end. However, assuming that the insulation leakage remains below its predetermined value and that the continuity current does not fall below its predetermined value during the delay interval, then at its completion, device 7 fires and conducts, thereby energizing relay K-10. This causes normally closed contacts K-10a and K-10b to open, thereby removing the control potentials from both the first and second control electrodes of device 7, which will henceforth continue to conduct as long as contact K-9d remains closed.

The energization of relay K-10 causes normally open contact K-10c to close. This permits the energizing of relays K-11 and K-12 through the normally closed contacts K-13a and K-13b of relay K-13. Relay K-12 is a slow-release relay, that is, it is of the type which operates practically instantaneously in response to the energizing current, but which takes a comparatively long interval of time in which to re-open or re-close, as the case may be, after the de-energizing of the coil. Relay K-13 is a slow-operate relay, that is, it is of the type in which the contacts operate after a comparatively long interval of time after the energizing of the coil, but which return to their normal position practically instantaneously when the coil is de-energized.

The operation of relay K-12 causes normally open contact K-12a to close, thereby energizing relay K-14. The operation of relay K-14 causes normally closed contacts K-14a and K-14b to open, thereby removing the 3,000 volt test potential from the circuit under test, and de-energizing the current supply units so as to remove the continuity current. This removal of continuity current from the circuit under test results in the de-energizing of relay K-7 (or relay K-8 depending on which continuity circuit is in use), and the subsequent de-energizing of relay K-9 due to the opening of contact K-7a (or contact K-8a). The operation of relay K-14 also causes relay K-4 to be de-energized due to the opening of contact K-14d. Thus the operation of relay K-14 breaks the chain of holding relays that put devices 6, 5, and 7 into operation and relays K-4, K-5, K-6, K-7 (or K-8), K-9, and K-10 all revert to their de-energized states.

At the same time that slow-release relay K-12 was energized through the closing of contact K-10c, the coil of relay K-11 was also energized. This causes normally open contacts K-11a to close, thereby applying the negative side of the 24 volts D. C. supply to lead 32. This voltage operates on the unit rotary switch of Fig. 2 as will be described later. The energizing of relay K-11 also causes normally open contact K-11c to close, thereby applying the negative 24 volts D. C. to normally open contact K-15a of a relay K-15 such that, when relay K-15 is energized, this negative voltage will then be applied to lead 33. This voltage operates on the bank rotary switch of Fig. 2 as will be described later. Relay K-11 also has a holding contact K-11b which maintains the coils of relay K-11 and relay K-12 energized, in spite of the re-opening of contact K-10c through the de-energizing of relay K-10.

The energizing of relay K-14 causes normally open contact K-14c to close, thereby permitting the energizing of slow-operating relay K-13. After a short time interval, normally closed contacts K-13a and K-13b open, thereby de-energizing the coils of relays K-11 and K-12. Relay K-11 operates immediately and through the re-opening of its contact K-11a, removes the unidirectional voltage applied to lead 32 as will be described subsequently. This allows the stepping of the unit rotary switch of Fig. 2, thereby bringing the new circuit in the item under test across leads 11 and 12, or 13 and 14, as the case may be.

The initiation of the testing sequence for the next circuit is now brought about by the release, after an interval of time, of contact K-12a of slow-release relay K-12. This in turn causes relay K-14 to be de-energized. Thereupon, the normally closed contacts K-14a reclose, thereby putting the test potential across the circuit under test, contacts K-14b revert to their normally closed position, thereby re-energizing current supply units 3 and 4. Contact K-14d also reverts to its normally closed position, thereby permitting the energizing of relay K-4. It will be recalled that relay K-4 was originally energized by the depression of the start-switch S-4 and subsequent operation of relays K-2 and K-3, so that its re-energizing is now equivalent to starting the testing sequence over again.

The cycle which has just been described will repeat itself for each and every circuit of the item under test which meets the required predetermined conditions of a leakage current falling below a certain value and a continuity current exceeding a certain value. If, at any time during the sequence of operations, the interlocked enclosure is opened, relays K-1, K-2, and K-3 will be de-energized, thereby causing the removal of the alternating supply voltages from the high voltage units and bringing the sequence of operations to an end. Also stop switch S-5 can be used at any time to stop the sequence of operations. In this case, relays K-2 and K-3 are de-energized and the sequence of operations must be resumed by pressing the start switch S-4 again.

Referring now to Fig. 2, there is shown a unit rotary switch S-6 which has five banks of contacts designated as S-6a through S-6e, each of which has a rotating contact arm such as arm 50 in switch bank S-6a. Arm 50 advances by one step at a time through the operation of the armature 51. Armature 51 moves up when coil 52 is energized; however, the rotating arm 50 does not advance immediately, but advances when the armature returns to its original position upon the de-energizing of coil 52. One side of coil 52 is connected to the positive 24 volt supply through lead 30, and switch S-6 operates one step at a time whenever the negative 24-volt supply is applied and removed through lead 32. Switch S-6 can also operate as a self-stepping mechanism, moving continuously from one switch position to the next when the negative 24 volt supply is applied to lead 34. This is due to the fact that armature 51, along with contact 53, then operates as an interrupter to apply a series of pulses to the lead 54.

Banks S-6a, S-6b, and S-6c of rotary switch S-6 serve respectively relay banks, A, B, and C. Each bank contains a group of relays of which there are five per bank in the present embodiment. These relays are of the double pole double throw type. Relay K-A1 in relay bank A has its coil connected to position 1 of unit rotary switch bank S-6a; similarly relay K-A2 has its coil connected to position 2 of the unit rotary switch S-6a, and likewise for the other relays, in relay bank A. In the same fashion, the coils of the relays in relay banks B and C are connected in succession to the contacts of unit rotary switch banks S-6b and S-6c respectively.

Rotary switch S-6 has a bridging bank S-6d, of which all the contacts except one are tied together and connected to lead 34. The rotary arm 55 of this bank is connected through lead 54 to the interrupter contact 53, which in turn is connected through the coil 52, to the positive 24 volt supply via lead 30. Lead 34 is connected to the negative 24 volt supply through contact K-1c whenever relay K-1 is un-energized. The purpose of the bridging bank is to provide voltage to the self-stepping circuit of rotary switch S-6 for all positions of the rotary switch arm except one, whenever relay K-1 is un-energized. In the present embodiment, the contact in position 1 of rotary switch bank S-6d is free, so that the switch will come to rest in that position. Rotary switch S-6 has, in addition, a bank S-6e, whose contacts are connected to a number of pilot lamps PL-1 through PL-5 which serve as unit indicators. The rotary contact arm of this bank is connected through lead 36 to the negative 24 volt supply. The pilot lamps operate whenever relay K-1 is energized due to their connection to the positive 24 volt supply through lead 37 and contact K-1e.

Rotary switch S-7 is of the same type as rotary switch S-6 but has only two banks of contacts, namely S-7a and S-7b. The rotary arm of bank S-7a is connected to the negative 24 volt supply through lead 36. This voltage is applied to the arm of one of the banks of rotary switch S-6, depending on the position of the contact arm of bank S-7a. In addition, each contact of bank S-7a is connected to a pilot lamp of which there are three in the present embodiment, namely PL-a, PL-b, and PL-c. These pilot lamps serve as bank indicators, and one of them lights to indicate the relay bank in which a relay is energized. In combination with the unit indicating pilot lamps, the bank indicating pilot lamps provide a complete identification of the relay which is energized at any particular time. Thus, for example, when pilot lamps PL-1 and PL-A are lit, relay K-A1 is energized and the circuit connected to its terminals T-A1 is in the test position. Similarly when pilot lamps PL-2 and PL-B are lit, relay K-B2 is energized and the circuit connected to terminals T-B2 is in the test position.

Rotary switch S-7 comprises in addition, a bridging bank S-7b, of which all the contacts but one are tied together and connected to the negative 24 volt supply through lead 35 and contact K-1d, whenever relay K-1 is un-energized. The arm of bank S-7b is connected through the interrupter contact to one side of the coil of rotary switch S-7. The other side of this coil is connected through lead 30 to the positive 24 volt supply. In the present embodiment, contact A of the bridging bank S-7b is free, so that rotary switch S-7 would normally come to rest at position A.

One side of the coil 52 of rotary switch S-6 is connected to lead 32 and accordingly is energized when both contacts K-11a and K-1a are closed  One side of the coil of rotary switch S-7 is also connected to lead 33 and accordingly, is energized when contacts K-1b, K-11c and K-15a are closed. The coil of relay K-15 is connected through lead 31 to the fifth contact of bank S-6e of rotary switch S-6 in such a manner that relay K-15 is energized whenever rotary switch S-6 steps to its fifth position. As a result, when rotary switch S-6 completes a revolution and passes from its fifth position to its first position, the coil of rotary switch S-7 is de-energized so that its rotary contact arm moves up to the succeeding position in its sequence. The purpose of this arrangement is to cause the bank selector to move up one position whenever the unit selector has gone through a complete revolution and moves from position 5 to position 1.

To illustrate the operation of the circuit, let it be assumed that both the unit selector rotary switch S-6 and the bank selector switch S-7 have advanced to a certain position so that a relay, for example, relay K-B2, is energized. If the interlocking enclosure is now opened, the coil of relay K-1 will be de-energized so that contacts K-1c and K-1d return to their normally closed position. This applies the negative 24 volt supply voltage to the contacts of bridging banks S-6d and S-7b through leads 34 and 35. Since it has been assumed that relay K-B2 was energized, rotary switch S-6 is then in position 2 and rotary switch S-7 is in position B. Accordingly, the negative 24 volt supply is applied to the self-stepping interrupting contacts of both rotary switches through the bridging bank contacts, and the arms of the switches move around to positions 1 and A respectively, whereupon both switches come to rest.

Let it be assumed now that the circuits of an item under test are connected to the output terminals T-A1, T-A2, etc. of relay bank A, and T-B1, T-B2, etc. of relay bank B, and so on. When the interlocked enclosure is closed, relay K-1 is energized and contacts K-1c and K-1d open so that the self-stepping circuits of the rotary switches become inoperative. Also, contact K-1e closes so that the positive 24 volt supply is applied to one side of all the double-pole double-throw relays in relay banks A, B and C through lead 37. The negative 24 volt supply is applied to the other end of the coil of relay K-A1 through lead 36, the arm and contact A of bank S-7a of rotary switch S-7, and the arm and contact 1 of bank S-6a of rotary switch S-6. The energizing of the coil of this relay causes its contacts to operate and disconnect terminals T-A1 from ground and connect them to leads 11 and 12.

The testing circuits shown in Fig. 1, meanwhile, operate and apply the continuity current and the test potentials to leads 11 and 12. Assuming that both tests are satisfactory, the continuity current and the test potential are removed after a suitable lapse of time, and relay K-11 operates, thereby closing contact K-11a and energizing coil 52 of rotary switch S-6. After another interval of time which is long enough to permit the complete energizing of coil 52, relay K-11 becomes de-energized and contact K-11a opens, whereupon switch S-6 steps to position 2, thereby energizing relay K-A2, the next in the series of circuit relays, and the sequence repeats itself.

This sequence of events repeats itself for every circuit under test that proves satisfactory for both continuity and high potential. In the case of relay bank B, the terminals T-B1 through T-B5 are not grounded when the relays are un-energized, and are connected to leads 13 and 14 when the relays are energized. Thus this bank is used in conjunction with current supply unit 4 for testing for continuity only and not for high potential.

Referring to Fig. 3, there is shown a typical test item which is connected to the automatic testing equipment illustrated in Figs. 1 and 2. The test item comprises two sections 60 and 61 of a five conductor cable, which are joined together at a junction box 62. Conductors 63, 64, and 65 of the cable make a continuous circuit through the junction box. Likewise, conductors 66 and 67 make a continuous circuit through the junction box but have a common connection therein through a strap 68.

To test this cable, the ends of conductors 63, 64, 65, and 66 are connected to the terminals T-A1 through T-A4 of relay bank A. A strap 69 is placed across the terminals T-A5 for the purpose of maintaining the sequential operation of the apparatus through relay bank A. The ends of conductors 66 and 67 at section 60 are connected to terminals T-B1 of relay bank B, and likewise the ends of these conductors at section 61 are connected to terminals T-B2.

Assuming that the continuity and the insulation of the conductors throughout the cables, and that the connections in the junction box are also satisfactory, the automatic test apparatus will now go through its sequential operation, and, starting with terminals T-A1, will apply continuity current and test potential to conductors 63, 64, 65, and 66. The testing of conductor 66 serves at the same time as an insulation leakage test of conductor 67 since the two are connected together. The automatic test apparatus then steps through terminal T-A5 and goes through terminals T-B1 and T-B2, testing these for continuity only. Since test terminals T-B3 are open circuited, if all circuits are satisfactory, the apparatus will come to rest immediately after testing these terminals, and pilot lamps PL-3 and PL-B will remain lit, thereby indicating that all circuits of the item have successfully withstood the tests.

The embodiment of my invention which has been described is actually a greatly simplified circuit of an actual construction, as will be readily apparent to those skilled in the art. In the actual construction, the number of relays is very much larger than that which has been indicated. Various safety features have been omitted in this description, and also a number of interdependent relays have been considered as a single relay, again for the purpose of simplifying the description. In the actual construction, all high voltage contacts are operated by separate relays from those carrying low voltage contacts, and these are linked together through interlocking relays. Moreover, it will be readily apparent that although the relay banks have been shown as containing five relays, they can contain much greater numbers. In the actual construction which has been made, there are eight relay banks, each bank containing twenty-five individual relays so that a total of 200 separate circuits can be tested in sequence for both continuity and high potential. Each individual relay can be connected to either leads 11 and 12 to provide both the continuity and the insulation resistance test, or to leads 13 and 14 to provide the continuity test alone.

While a specific embodiment has been shown and described, it will of course, be understood that various modifications may be made without departing from the invention. The appended claims are therefore intended to cover any such modifications within the true spirit and scope of my invention.

What I claim as new and desire to secure by Letters Patent of the United States is:

1. An apparatus for sequentially and automatically testing a plurality of external circuits for insulation resistance and for continuity, comprising a source of test potential and a source of test current, a plurality of relays, each of said relays having a pair of terminals to which said circuits are connected, said relays operating to connect said terminals to both said sources when energized, a rotary switch for energizing said relays, a timing network for controlling the operation of said rotary switch, for causing it to successively energize a single one of said relays for a discrete predetermined time interval, and current responsive means for disabling said timing network when the current resulting from said test potential exceeds a predetermined value and also when said test current fails to attain another predetermined value.

2. An apparatus for sequentially and automatically testing a plurality of external circuits for insulation resistance from ground and for continuity, comprising a source of test current and a source of test potential connected, in series with an impedance, between said current source and ground, a plurality of relays, each of said relays having a pair of terminals adapted to receive a connection from said circuits, said relays operating to connect said terminals to said source when energized, a rotary switch for energizing said relays, a timing network for controlling the operation of said switch and for causing it to successively energize a single one of said relays for a discrete predetermined time interval, a current responsive device in series with said current source for disabling said timing circuit when said test current fails to attain a predetermined value, and a voltage responsive device connected to said impedance for disabling said timing circuits when said test potential produces a voltage across said impedance, exceeding a predetermined value.

3. An apparatus for testing an external circuit for insulation resistance, comprising a source of high potential, a first, a second, and a third electron discharge device, each of said devices being normally non-conducting and having a control electrode, a pair of charging circuits adapted to be connected to the control electrodes of said first and third devices respectively, means for simultaneously applying said potential across said insulation in series with an impedance and for connecting one of said charging circuits to the control electrode of said first device to control the firing thereof, means operative upon the firing of said first device, for connecting said impedance to the control electrode of said second device and for connecting said other charging circuit to the control electrode of said third device, an indicator and a relay in the circuit of said second device for rendering said first means inoperative upon the firing of said second device, thereby indicating the insufficiency of said insulation, and means co-operating with said third device, for removing said potential after a predetermined time interval dependent upon said other charging circuit.

4. An apparatus for testing an external circuit for insulation resistance, comprising a source of high potential, a first, a second, and a third electron discharge device, each of said devices being normally non-conducting and having a control electrode, a pair of charging circuits adapted to be connected to the control electrodes of said first and third devices respectively, relays for simultaneously applying said potential between said external circuit and a grounded resistor, and for connecting one of said charging circuits to the control electrode of said first device to control the firing thereof, means to energize said relays, means operative upon the firing of said first device, for connecting said resistor to the control electrode of said second device and for connecting said other charging circuit to the control electrode of said third device, a relay and an indicator in the circuit of said second device for rendering said first named means inoperative and for indicating the insufficiency of said insulation upon the firing of said second device when said potential produces a voltage, exceeding a predetermined value, across said resistor, and means, co-operating with said third device, for removing said potential after a predetermined time interval dependent upon the constants of said other charging circuit.

5. An apparatus for testing an external circuit for insulation resistance from ground and for continuity comprising a source of test potential, and a source of test current, a first, a second, and a third electron discharge device, each of said devices being normally non-conducting and having a control electrode, a pair of charging circuits adapted to be connected to the control electrodes of said first and third devices respectively, relays for simultaneously applying said test potential between said external circuit and a grounded resistor, and said test current to said external circuit in series with a current responsive device, and for connecting one of said charging circuits to the control electrode of said first device to control the firing thereof, means to energize said relays, means operative upon the firing of said first device, for connecting said resistor to the control electrode of said second device and for connecting said other charging circuit to the control electrode of said third device, a relay and an indicator in the circuit of said second device for rendering said first named means inoperative and for indicating the insufficiency of said insulation upon the firing of said second device, when said test potential produces, across said resistor, a voltage exceeding a predetermined value, said current responsive device being organized to also render said first named means inoperative when said test current fails to attain a predetermined value, and to indicate thereby the defective condition of said continuity.

6. An apparatus for automatically testing a plurality of external circuits for insulation resistance from ground and for continuity comprising a source of test potential, and a source of test current, a first, a second and a third electron discharge device, each of said devices being normally non-conducting and having a control electrode, a pair of charging circuits adapted to be connected to the control electrodes of said first and third devices respectively, a chain of relays for simultaneously applying said test potential between a pair of output terminals and a grounded resistor, and said test current to said terminals in series with a current responsive device and for connecting one of said charging circuits to the control electrode of said first device to control the firing thereof, a plurality of circuit relays adapted to receive connections from said external circuits and to connect said external circuits to said pair of output terminals when energized, a plural position rotary switch for energizing said relays one at a time in sequence, said rotary switch being linked to said chain to move forward one position whenever said chain is energized, means to energize said chain of relays, means operative upon the firing of said first device for connecting said resistor to the control electrode of said second device and for connecting said other charging circuit to the control electrode of said third device, a relay and an indicator in the circuit of said second device for rendering said first named means inoperative and for indicating the insufficiency of said insulation upon the firing of said second device when said test potential produces, across said resistor, a voltage exceeding a predetermined value, said current responsive device being organized to also render said first named means inoperative when said test current fails to attain a predetermined value and to indicate thereby the defective continuity of said circuit, and means, co-operating with said third device, for de-energizing and subsequently re-energizing said chain of relays after a predetermined time interval dependent upon the constants of said other charging circuit, whereby said rotary switch moves forward one position to energize a succeeding circuit relay.

ROBERT A. DONCYSON.

REFERENCES CITED

The following references are of record in the file of this patent:

UNITED STATES PATENTS

| Number | Name | Date |
| --- | --- | --- |
| 1,977,703 | Swartwout | Oct. 23, 1934 |
| 2,043,528 | Davis | June 9, 1936 |
| 2,440,480 | Lewis | Apr. 27, 1948 |
| 2,459,801 | Fahrner | Jan. 25, 1949 |
| 2,478,945 | Rose | Aug. 16, 1949 |
| 2,529,227 | Rosenblum | Nov. 7, 1950 |